US010318905B2

(12) United States Patent
Rubio et al.

(10) Patent No.: US 10,318,905 B2
(45) Date of Patent: *Jun. 11, 2019

(54) SYSTEM AND METHOD FOR ACCESSING BUSINESS PROCESS INSTANCES THROUGH MOBILE DEVICES

(71) Applicants: Eduardo Carlos Rubio, Capital (AR); Paulo Gustavo Veiga, Buenos Aires (AR)

(72) Inventors: Eduardo Carlos Rubio, Capital (AR); Paulo Gustavo Veiga, Buenos Aires (AR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 15/476,414

(22) Filed: Mar. 31, 2017

(65) Prior Publication Data

US 2017/0206484 A1 Jul. 20, 2017

Related U.S. Application Data

(63) Continuation of application No. 12/235,308, filed on Sep. 22, 2008, now Pat. No. 9,646,274.
(Continued)

(51) Int. Cl.
*G06Q 10/00* (2012.01)
*G06Q 10/06* (2012.01)
(Continued)

(52) U.S. Cl.
CPC ......... *G06Q 10/06315* (2013.01); *G06F 8/36* (2013.01); *G06F 9/4881* (2013.01);
(Continued)

(58) Field of Classification Search
CPC ......... G06Q 10/0631; G06Q 10/06313; G06Q 10/06315; G06F 8/10; G06F 17/30867
See application file for complete search history.

(56) References Cited

U.S. PATENT DOCUMENTS 6,345,279 B1 * 2/2002 Li .................... H04L 29/06
2003/0131143 A1 * 7/2003 Myers .................. G06F 9/542
719/318

(Continued)

OTHER PUBLICATIONS

Lemlouma, T., & Layaida, N. Context-aware adaptation for mobile devices. IEEE International Conference on Mobile Data Management, 2004. Proceedings. 2004. (Year: 2004).*

*Primary Examiner* — William S Brockington, III
(74) *Attorney, Agent, or Firm* — Tucker Ellis LLP

(57) ABSTRACT

A BPM system is described for modeling, management and execution of business processes. A process designer component is used to graphically design a business process, which includes a set of activities linked by transitions. The business process is stored and executed using one or more engines. A mobile device can be used to access the business process instance executing on the engine. The mobile work portal can be generated to render information for the process instance onto the mobile device. A process application programming interface can be used to access and manipulate the process instance from the mobile device.

20 Claims, 5 Drawing Sheets

Related U.S. Application Data

(60) Provisional application No. 61/027,762, filed on Feb. 11, 2008.

(51) Int. Cl.
| | | |
|---|---|---|
| *G06F 8/36* | (2018.01) | |
| *G06F 9/48* | (2006.01) | |
| *G06F 9/445* | (2018.01) | |
| *H04L 29/08* | (2006.01) | |
| *H04W 88/02* | (2009.01) | |

(52) U.S. Cl.
CPC ......... *G06Q 10/06* (2013.01); *G06Q 10/0631* (2013.01); *G06Q 10/06316* (2013.01); *G06F 9/445* (2013.01); G06Q 10/0633 (2013.01); G06Q 10/06313 (2013.01); H04L 67/04 (2013.01); H04W 88/02 (2013.01)

(56) References Cited

U.S. PATENT DOCUMENTS

| | | | | |
|---|---|---|---|---|
| 2004/0230636 | A1* | 11/2004 | Masuoka | G06F 9/451 708/800 |
| 2005/0108574 | A1* | 5/2005 | Haenel | H04L 63/0815 726/4 |
| 2006/0075464 | A1* | 4/2006 | Golan | G06F 21/604 726/1 |
| 2007/0208587 | A1* | 9/2007 | Sitaraman | G06Q 10/10 709/232 |
| 2007/0233881 | A1* | 10/2007 | Nochta | G06F 9/5044 709/228 |
| 2008/0005743 | A1* | 1/2008 | Kraft | G06F 9/4488 718/104 |
| 2008/0040488 | A1* | 2/2008 | Gupta | H04L 67/16 709/227 |
| 2008/0052274 | A1* | 2/2008 | Moore | G06Q 10/00 |

\* cited by examiner

SYSTEM AND METHOD FOR ACCESSING BUSINESS PROCESS INSTANCES THROUGH MOBILE DEVICES

CLAIM OF PRIORITY

The present application is a continuation of U.S. patent application Ser. No. 12/235,308, entitled SYSTEM AND METHOD FOR ACCESSING BUSINESS PROCESS INSTANCES THROUGH MOBILE DEVICES, by Eduardo Carlos Rubio et al., filed on Sep. 22, 2008, now U.S. Pat. No. 9,646,274, which claims the benefit of U.S. Provisional Patent Application No. 61/027/762, entitled SYSTEM AND METHOD FOR ACCESSING BUSINESS PROCESS INSTANCES THROUGH MOBILE DEVICES, by Eduardo Carlos Rubio et al., filed on Feb. 11, 2008, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to business process management software tools for design and execution, and more particularly to accessing business process instances via WAP-compliant mobile devices.

BACKGROUND

In a typical large scale organization, the competitive pressures, customer expectations and compliance with regulations drive the ever increasing need for the enterprise to become more agile, flexible and dynamic when it comes to automated systems and information technology (IT). To address these needs, service oriented architectures (SOA) have recently surfaced and transformed how such organizations integrate and connect to information systems. For example, SOA has come a long way in providing a unified way for applications to interact with each other and to expose functionality as services using industry standards. Today, many enterprises are implementing SOA to reduce the costs of integration and to attain more rapid development cycles.

However, SOA initiatives have been mostly focused on efficiency and adaptability in IT. In order to truly realize the business value of SOA a somewhat different approach is desirable, one that is focused on the various business processes of an organization and one that allows IT to be seamlessly integrated into these business processes, empowering collaboration between business and IT.

In recent years, business process management (BPM) software systems have become more and more widely used among various organizations. For a typical business enterprise, it is usually desirable to integrate all of its data and processes into a single and unified system. For example, an organization may automate a business process by having a computer perform certain activities of the business, such as receiving a sales order, sending a notification to a client, or reminding a human participant of work that needs to be performed.

While automation of such business processes has posed a number of difficulties, software BPM systems have become ever increasingly important solutions to many organizations. By implementing software BPM suites, enterprises are becoming more and more able to increase productivity, performance, profits and decrease inefficiency due to various factors. Nevertheless, a multitude of inefficiencies and problems remain in the BPM software world. The lack of seamless access to the various processes from virtually any device and deficiencies in integration with such devices have surfaced as possible areas of improvement. In addition, the lack of process intelligence able to support such functionality has been an issue. Applicants have identified the foregoing, as well as other needs, which currently exist in the art, in coming to conceive the subject matter of the present disclosure.

DETAILED DESCRIPTION

Figure 1:
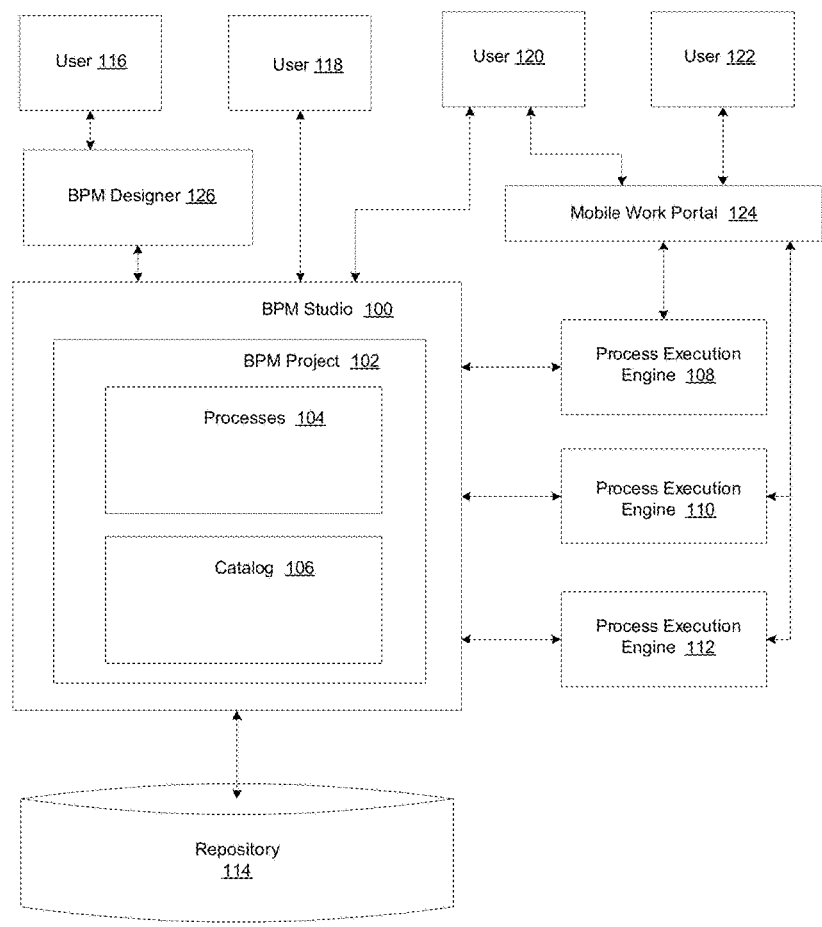
FIG. 1 is an illustration of an exemplary business process management system, in accordance with various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details will be set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device or appliance. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided systems and methods for accessing business process instances via mobile devices. The ability to access the process instance from a mobile device allows users to participate in business process systems through wireless devices in a timeline fashion. The users are able to interact with the BPM tasks via their mobile devices, allowing access to some of the simpler interactive activity implementations. As an illustration, users can receive notifications whenever new instances arrive to their inbox and access that new implementation from their cellular telephone. Given the fact that most cellular phones have more limited display capabilities than a personal computer, the process instance/task can be filtered based on views and the capabilities of the mobile device. A process application programming interface (PAPI) is provided to enable the mobile device to access and manipulate the process instance and various state information associated therewith.

In various embodiments, the system described is a business process management (BPM), modeling and execution system. This BPM system can be used to integrate a plurality of heterogeneous applications within an enterprise into a single graphically defined process. Furthermore, the BPM system can allow creation of new processes which can invoke these existing applications in order to reuse their functionality and prevent duplication of code.

In various embodiments, the BPM system includes a process designer component that can be used to graphically draw a definition of a business process. The process can be comprised of activities linked by various transitions, all of which can be graphically represented in the process definition.

At a high level, the business process is designed to represent a specific set of business tasks and activities which must be executed in an organization to reach a well-defined outcome. When this outcome is reached, the process is deemed to be complete. Examples of such processes can include hiring a new employee, processing a sales order, reimbursing a business expense and other more complex processes according to the particular needs of the organization. In some cases, it may not be possible to reach the main goal of the process. For example, the shipping clerk may have to cancel a sales order because the product is out of stock. Therefore, a business process allows different possible end conditions besides the principal objective of the process. Preferably, it can allow more than one way to reach the main objective. For instance, if the product is out of stock it may be possible to offer an equivalent alternative. In turn, this offer may be accepted or rejected. A range of possibilities can thus be included in the process.

At a more detailed level, the business process can be broken down into a set of logical steps called activities, each of which can comprise one or more tasks. As an illustration, an activity that notifies a client of an incomplete sales order may include the task of sending an electronic mail (email) message to the client. Each of these tasks and activities can be graphically represented in the business process definition. When activities are executed automatically by the system, they are referred to as automatic activities. When human input is required, they are referred to as interactive activities. As an illustration, the following are the types of activities that can be included in the BPM system:

a. Process Initiation/Termination Activities—These activities function as a beginning and end points for the process. The activities are automatically generated and define the scope of the process. Examples of this type of activity include Begin Activity and the End Activity.

b. Human Interaction Activities—Allows user interaction with process. Examples include Interactive Activity, Grab Activity and Decision Activity.

c. System Activities—Handle automatic interactions with business systems. Example is an Automatic Activity.

d. Organizational Interaction Activities—Allow communication with other areas and processes of an organization. Examples include Process Creation Activity, Termination Wait Activity, Process Notification Activity, Notification Wait Activity and Dynamic Process Call Activity.

e. Process Control Activities—Control process flow or generate copies of a process instance to allow flow through multiple paths simultaneously. Examples include Split Activity, Split N Activity, Join Activity and Conditional Activity.

f. Global Activities—Handle global requirements that are not associated with a specific process instance. Examples include Global Creation Activity and Global Automatic Activity.

g. Miscellaneous Activities—Provide other functionality with a process. Examples include Connectors and Measurement Marks.

It should be noted that the above activities are provided purely for illustrational purposes and that the BPM system is not limited to this or any other specific list of activity types.

In various embodiments, the activities of the business process are linked by transitions, which bridge the activities and determine the order in which the activities will be performed and the basic workflow for the process. In other words, the transition determines which path the process will follow from any given activity. As an illustration, the BPM system can support the following transition types:

a. Conditional Transition—the path of the transition is taken if an expression evaluates as true.

b. Due Transition—the path is taken if the process instance remains in the activity longer than the specified time. In one embodiment, time can be specified directly, via expression, or by looking up an external metric.

c. Error Transition—the path is taken if an error occurs.

d. Compensate Transition—the path is taken when an activity or group of activities require that the actions performed by the BPM methods should be reversed.

e. Unconditional Transition—the path is taken if all other transitions evaluate false.

It should be noted that these are intended to be non-limiting examples of transitions and other such transitions between activities are possible within the scope of the present embodiments.

In one embodiment, all activities have at least an outgoing unconditional transition so there is always a way to continue the process. In most real-world processes several activities also have outgoing conditional transitions. In this case, the conditional transitions are evaluated first, and the unconditional transition is taken only if the conditional transitions all evaluate to false. In programming terms, the unconditional transition is like an else clause in an if-then-else construct. In one embodiment, the business rule transitions are evaluated before conditional transitions, so if a business rule transition and a conditional transition both evaluate to true, the business transition is used. Due transitions can act separately. They can pull the instance from the activity as soon as a time condition is met. In this case, all other outgoing transitions can be ignored.

In various embodiments, each activity of the business process can belong to a role. Roles can then be assigned to participants who are the actual individual users who interact with the process. A given participant can have one role or multiple roles. The participants who can perform an activity are those who have been assigned the role that the activity belongs to. In certain embodiments, the roles can be parametric, i.e. they can take on different values at execution of the process instance and depending on that value at execution time, the task can be assigned to a different person. For example, depending on the dollar amount of the credit request, the same activity of the process can be directed to a different approval manager according to that value. Similarly, depending on the value of the geographical region where the request originated, the activity/task may be forwarded to a different person. The parametric role thus allows one business process definition and one activity to be executed by different roles, depending on specific values which take place at runtime.

In various embodiments, the BPM system further includes an execution console that manages the execution of process instances by the engines, and a repository that maintains state data associated with each process instance (e.g. persistent variables and decisions of the process). Furthermore, the system can include an organizational settings module that populates the process with organization-specific values upon instantiation.

Business process are thus designed with the process designer and executed with a BPM execution engine, along with client applications, management tools, and other components, to interact with it. All of these modules can be included within the BPM system. Additionally, if a business process invokes web services, reads from a custom database, or uses Enterprise JavaBeans (EJBs), it may be necessary to ensure that these services are available in order to enable the application to work as expected.

In various embodiments, the BPM system can be used to integrate a set of multiple, heterogeneous applications (both backend and front end applications) into a single and seamless business process. New business processes can then be similarly created to invoke these existing applications. To achieve this, integration adapters can be generated using technology-specific discovery mechanisms. This approach enables integration with a wide range of common technologies, including but not limited to Java libraries, .NET assemblies, COM/DCOM components, Web Services, message queues, Enterprise Java Beans (EJBs), CORBA objects, relational databases and XML documents. In one embodiment, the BPM system introspects or discovers the metadata from any application programming interface (API) to identify the business service and its incumbent data, and then packages those elements as reusable components that are invoked from business processes when required. For example, when a business process instance is executed, one of its activities can invoke an application, while another activity can invoke a completely different application, one that is remotely located and built on a different technology platform from the first application.

When a business process is executed by an engine, it forms a specific process instance. A business process instance is a specific item proceeding through the business process. Thus, the process instance is the representation of a single enactment of a process, or an activity within a process, including its associated data. For example, in a business process which handles purchases, each instance will be an individual purchase order. There can be any number of instances traversing a business process, as there can be any number of purchase orders going through a purchase order system. In one embodiment, each instance represents a separate thread of execution of the process or activity, and will have its own internal state and externally visible identity, which may be used, for example, to record or retrieve audit data relating to the individual enactment, such as a particular purchase order number, as opposed to the general purchase order process. Instances can start at the Begin activity of the process and finish in the End activity. The path the instances take can depend entirely on the data of the instance and the external environment.

Each process instance can have a specific history and properties. In the case of a purchase order, the instance would contain a customer name, a list of items, an amount due, dates of delivery and payment, and other relevant data. An instance can also have various status conditions. In the case of a purchase order, it may be desirable to know if it has been approved, if it has been paid for, or if the requested products have been shipped. The process instance can also utilize different backend applications within the enterprise via the introspection discovery mechanism previously described. Thus, each activity of the instance can invoke a different application within the enterprise.

Each instance has a beginning and end, as defined in the business process. As the instance proceeds through the process, it will be worked on by various participants or processed automatically by software. Thus, when the process instance is executed, activities and tasks are accessed by the various participants within the organization.

In one embodiment, the process instance can be accessed from a wireless application protocol (WAP) compliant mobile device in order to execute a specific activity. Given the popularity of WAP, a way for business process to participate in the business process is desirable. Thus, in accordance with the present embodiments, the participant in the business process is given access to the business process instance through the wireless device. The WAP-compliant device can include a cellular phone, a personal digital assistant (PDA) a watch or any other device with a central processing unit (CPU) that the user can carry.

A WAP-enabled mobile work portal can be generated to render either WAP or compact hypertext markup language (CHTML) based on the browser supported by the mobile device. In one embodiment, the mobile portal supports the execution of tasks of the process instance, in which all its user interaction is made through the display component, the input component or the Java Server Pages (JSP) component. The mobile work portal thus renders information associated with a particular process instance onto the mobile device such that the user can access and interact with the tasks of the business process instance. In one embodiment, the mobile work portal has some dependence on the web work portal for processing business process instances in a standard manner.

In one embodiment, the user is allowed to check pending instances, process each instance, execute global activities or receive notifications about new instances. Based on the user agent any of wireless markup language (WML), extensible hypertext markup language (XHTML) mobile profile (MP), or CHTML can be rendered to the mobile device.

In one embodiment, the user is provided with an inbox of pending process instances. When a new instance arrives to the user's inbox, a notification can be generated and transmitted to the user's mobile device. For example, a WAP Push Message can be sent to the user. One possible schema is to associate to each user a new group of properties specifying different notification universal resource locators (URLs) such as Jabber, hypertext transfer protocol (HTTP) and simple mail transfer protocol (SMTP). Upon receiving the notification, the user can process the instance by using the device. When processing selected instances, the actions a user can perform include selecting/unselecting an instance, sending an instance, aborting an instance, suspending an instance, resuming an instance, backing an instance and executing its main task.

In certain embodiments, due to the limited interface capabilities of the mobile device, not all interactive components of the process instance may be implemented. In these embodiments, there will be some process instances that will not be processed using the mobile work portal. While these instances may work fine under the standard web portal, the user interface of the mobile device may not be able to render the complex or detailed interaction required by the instance.

In one embodiment, the instances can be filtered according to whether their tasks can be executed using the particular interface of the mobile device. To accomplish this, task metadata can be developed to provide information about selecting what kind of execution components can be executed in the limited implementation on the mobile device. This information can be used to filter only those instances that can be executed using the mobile work portal.

In various embodiments, the PAPI interface is used to access the process instances and their data from the mobile device. This API is used to integrate the process engine to any third party application using either Java or Web Services programming logic. For example, the BPM system can be linked to various collaborative applications. The APIs can also be used to build custom front-ends that interact directly with the engine without using the BPM workspace.

FIG. 1 is an illustration of an exemplary business process management system, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, a business process management system can include a set of software components or modules that can be accessed via a network (e.g. the internet), by various users 116, 118, 120 and 122. The network can include wired or wireless communication-based, radio frequency (RF)-based, satellite, microwave or any other form of communication network where exchange of data is enabled between the components connected thereto.

In one embodiment, the BPM system comprises the BPM Studio 100 which provides the implementation environment for Information Technology (IT) and the process developers. The BPM Studio can use a shared process model for full round-tripping. In one embodiment, the Studio includes a forms builder, Web Services integration, and native API introspection for .NET, COM, Java and CORBA.

In various embodiments the BPM Studio includes a BPM Project view 102 which is comprised of processes 104 and the catalog 106. The catalog 106 is used to define, specify and contain the components or services that are called from a business process. These BPM components can include compiled software programs, classes or routines that are stored by the catalog manager in a data repository 114. In one embodiment, the catalog defines, describes and organizes the software components.

In various embodiments, the BPM system can additionally include an interface layer, such as a graphical user interface (GUI) accessible via a website or portal, for allowing a user to design, manipulate, execute and monitor the performance of various processes. Furthermore, the system can include a security layer that enables user authentication and authorization of services to the system.

The BPM process designer component 126 can be used to draw and design business process models by the users of the BPM system. Once the process is designed by using the process designer, its definition file can be generated and stored on a local or remote computer. The designer can also publish the created business processes. Once the designed business process is published, it can be stored into the data repository 114 and can later be deployed to an execution engine 108, 110, 112 for executing.

The execution console or manager can be used by various users of the system in order to manage any of the execution engines which have process instances executing thereon. In one embodiment, the execution engines are used to deploy the published business processes, execute tasks by the users, and perform automatic business process activities and perform any other tasks needed by each activity of the process instance. The execution engines 108, 110, 112 can manage the execution of each process instance. One example of such process instance is processing a specific sales order using a general business process for processing sales orders. The execution engine can retrieve and collect business process definitions from the repository, manage the execution of a particular user-interactive task or automatically execute the task if it is automated.

The mobile work portal 124 can be used by users 120, 122 to access a deployed process instance on one of the engines. The portal 124 can filter the instances which are not able to be performed on the mobile device that is being used by the participant. As an illustration, if the activity includes watching complex graphic rendering or video, and the user's mobile device interface does not support such features, the process instance can be filtered out. Alternatively, a simpler version of the interface can be rendered to the mobile device so that the participant can perform the task, albeit limited.

The BPM server (e.g. engine) can maintain the state of each executing process instance in the repository 114. A repository can include a relational database management system (RDBMS), file storage, content management systems as well as any other form of data storage systems. During the execution of the instance, persistent variables can maintain the values for each activity/task of the specific process instance. These variables can be stored in the repository and can be associated with the specific process instance.

In various embodiments, persistent variables can include instance variables and argument variables. Instance variables can record values that may be passed from one activity of a business process to another activity within the same business process. As such, instance variables maintain the state of the instance within the context of the business process. Argument variables, on the other hand record values that may be passed from one business process or instance to another business process or instance.

In various embodiments, the BPM system illustrated in FIG. 1 can have a multitude of different users. As an illustration, user 116 may be a business designer person that uses the BPM system to design the various processes desired by an enterprise. Users 118, 120, 122 can be employees of the enterprise which are responsible for executing the various activities of the business process instance. For example, user 122 can be a salesperson that receives a sales order, verifies it for completeness and enters it into the system. User 120 may be a supervisor who validates or otherwise resolves any exceptional situations that may occur. User 118 can be an administrator of the BPM system, responsible for monitoring and improving the performance of the business processes executing on the engines.

Each user or sets of users can be assigned to a particular role. In one embodiment, a role is a job function in a process that has associated activities to be performed by a user or group. Users and/or groups can be associated with process roles in the process administrator utility. A business process can include an abstract role that is used at design time to represent abstract user sets which will represent the persons in an organization responsible for performing the various activities of the process. Subsequently, the abstract role can be matched to an organizational role based on values that correspond to the actual users of the organization. As such, the organizational role can be parametric, by being assigned a value that corresponds to user sets and can take on multiple values that correspond to different user sets. The use of abstract roles enables a business process to be designed once and deployed to several different organizations, by specifying the organization-specific users and other parameters via the organizational settings.

Figure 2:
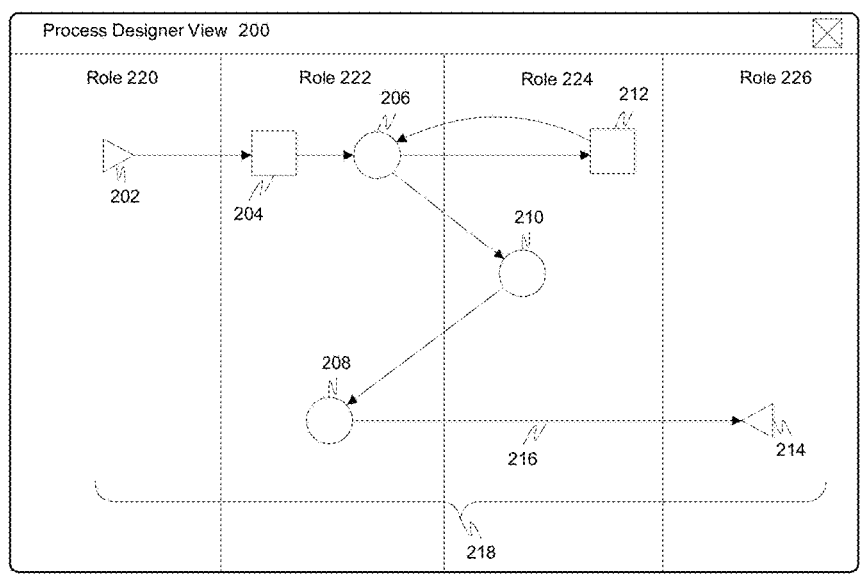
FIG. 2 is an exemplary illustration of an interface screen used to design and model business processes, in accordance with various embodiments.

FIG. 2 is an exemplary illustration of an interface screen used to design and model business processes, in accordance with various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Such components, regardless of how they are combined or divided, can execute on the same computing device or can be distributed among different computing devices connected by one or more networks or other suitable communication means. Furthermore, it will also be apparent to one of ordinary skill in the art that certain components can be added, interchanged or removed from this figure without departing from the scope of the various embodiments.

As illustrated, a process 218 can be designed by manipulating graphical icons of the interface screen 200. Custom colors and shapes can be used to designate the various activities, tasks and transitions of the business process. In one embodiment, a process includes a set of activities connected by one or more transitions 216. The set of activities can include a Begin activity 202 and an End activity 214 used to initiate and finish the execution of the business process respectively. Furthermore, each activity can be fully automated or can require user intervention. In one embodiment, fully automated activities 204, 212 can be illustrated as square-shaped icons, while those activities 206, 208, 210 involving human intervention can be illustrated by circular shaped icons.

The sequence of activities can be coupled by transitions such as transition 216. The transitions can be used to indicate which activity or activities are to be initiated after the completion of the current activity. Either one, multiple or no activities can be invoked after completion of each activity. In one embodiment, the number and invocation of the next activities depends on the data evaluated and decisions made during the current activity.

The business process 218 can be designed by using one or more roles 220, 222, 224, 226. At design time, these roles can be abstract roles so as to enable the use of the defined process with multiple organizations. At runtime, the abstract roles can be matched to organizational roles, with specific user sets filling each role. In one embodiment, the activity is placed in a particular role column, as illustrated in FIG. 2. The user that satisfies the role can be permitted or required to perform the various tasks of that activity. For example, the users assigned to role 222 can perform the tasks associated with activities 206 and 208 and users assigned to role 224 can perform the tasks associated with activity 210.

As one illustration, the business process 218 can be comprised of a sequence of activities for processing a sales order. Each activity could comprise its own series of tasks. For example, an activity that notifies a client of an incomplete sales order may include the task of sending a notification email message and a task of placing a telephone call to the customer. The activity of approving a sales order may include checking against a database whether the product is in stock.

It should be noted that the specific business process shown in FIG. 2 is provided purely for illustrational purposes and is not intended to limit the invention. The BPM system can be used to design, execute and monitor a wide variety of business processes, ranging from very simple to highly sophisticated. Furthermore, it should also be noted that the particular graphical symbols used to illustrate each activity or transition are also provided purely as examples and any alternative symbols could be used within the scope of the various embodiments described herein. In some scenarios, the symbols could also be made configurable by a user or administrator of the system.

Figure 3:
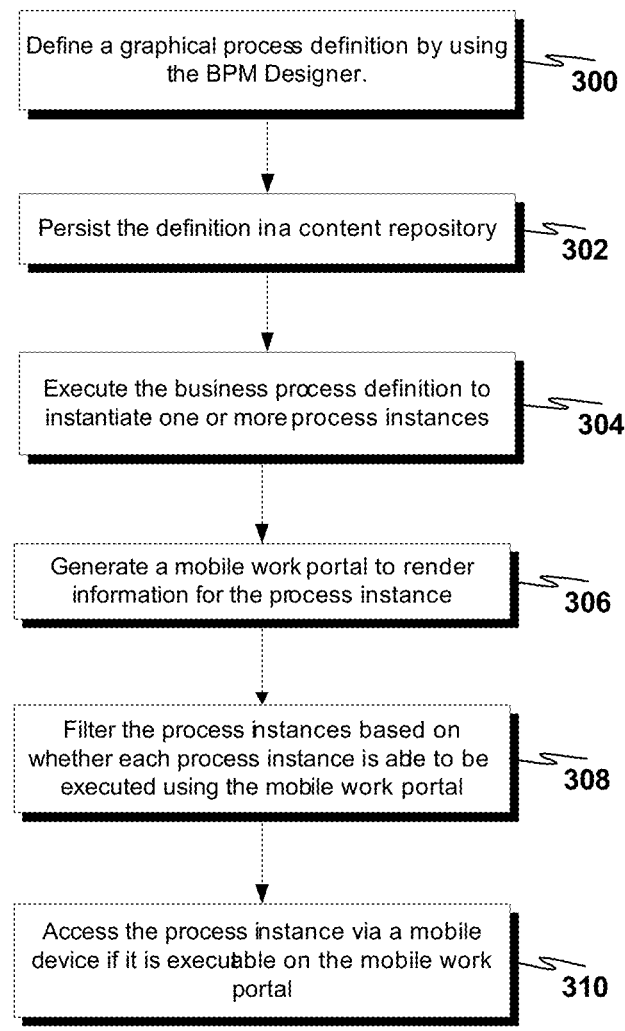
FIG. 3 is an exemplary flow chart diagram of accessing a process instance from a mobile device, in accordance with various embodiments.

FIG. 3 is an exemplary flow chart diagram of accessing a process instance from a mobile device, in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As illustrated in step 300, the process definition can first be graphically constructed by using the process designer component of the BPM system. This definition can include a set of activities which are linked by various transitions. Each activity can be comprised of one or more tasks for carrying out the activity. Once the process definition is defined, it can be persisted into a content repository, as shown in step 302. In one embodiment, the business process is published by compiling the activities, tasks and transitions into modular software objects and storing them in the content repository. The published business process(es) can be reviewed, tested and optimized prior to deploying them to an execution engine. When deploying the published process, a particular engine can be selected and the process can be deployed and executed on the that engine. In alternative embodiments, the publishing and deployment of processes can also be merged. Thus, in step 304, the process is executed on one or more engines in order to instantiate a process instance. The process instance represents a particular item going through the steps of the process.

In step 306, a mobile work portal can be generated to render information associated with the process instance onto various mobile devices. Depending on which specific type of device is used, the mobile portal can render CHTML, WAP, or other user interface technologies onto the device. In step 308, the process instances can be filtered according to whether they can be executed on the mobile work portal using the mobile device. For example, if the process instance requires complex graphics or display capabilities, the instance can be filtered out and precluded from being accessed by the mobile device. On the other hand, if the process instance merely requires input of data, the mobile device can be used to execute the various tasks of the instance. Accordingly, if the process instance is not filtered, it can be accessed from the wireless device, as shown in step 310. The accessing can utilize the PAPI interface. In one embodiment, the PAPI interface can be used to access any step of the process instance and retrieve information regarding that step. PAPI can be used to program a user interface (e.g. a WAP application) to access the process from the cellular phone or another type of mobile device. As an example, the WAP application can thus be executed on the mobile device and use the PAPI interface to make invocations to check if new instances have been received to the inbox.

Figure 4:
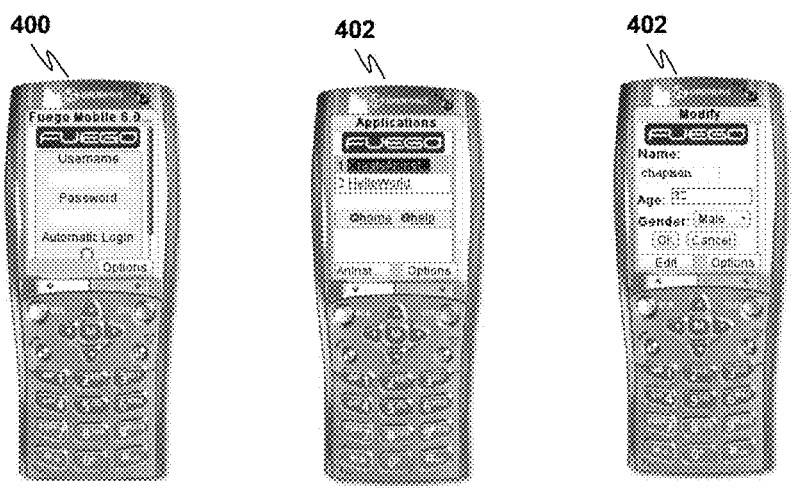
FIG. 4 is an illustration of the interface used to access process instances on the mobile device, in accordance with various embodiments.

FIG. 4 is an illustration of the interface used to access process instances on the mobile device, in accordance with various embodiments. Although this diagram depicts a cellular phone, such depiction is merely for illustrative purposes. It will be apparent to those skilled in the art that the cellular phone portrayed in this figure can be a personal digital assistance, a watch or any other hardware device having computing capability. In addition, it will be apparent to one of ordinary skill in the art that the functionality illustrated here can be implemented and accessed synchronously and synchronously by multiple mobile devices and/or computers.

As illustrated, the mobile device can provide an interface 400 for participants to authenticate themselves such as by entering a user name and password. In some embodiments, the authentication can result in assigning the participant to a particular role(s). The mobile device can also be provided with interfaces 402, 404 to view pending instances in the inbox, create new process instances and execute pending instances by performing the particular tasks. It should be noted that while FIG. 4 illustrates the rendering of XHTML to the mobile device interface, the embodiments described herein are not limited to any particular implementation and that other such technologies are also possible.

Figure 5:
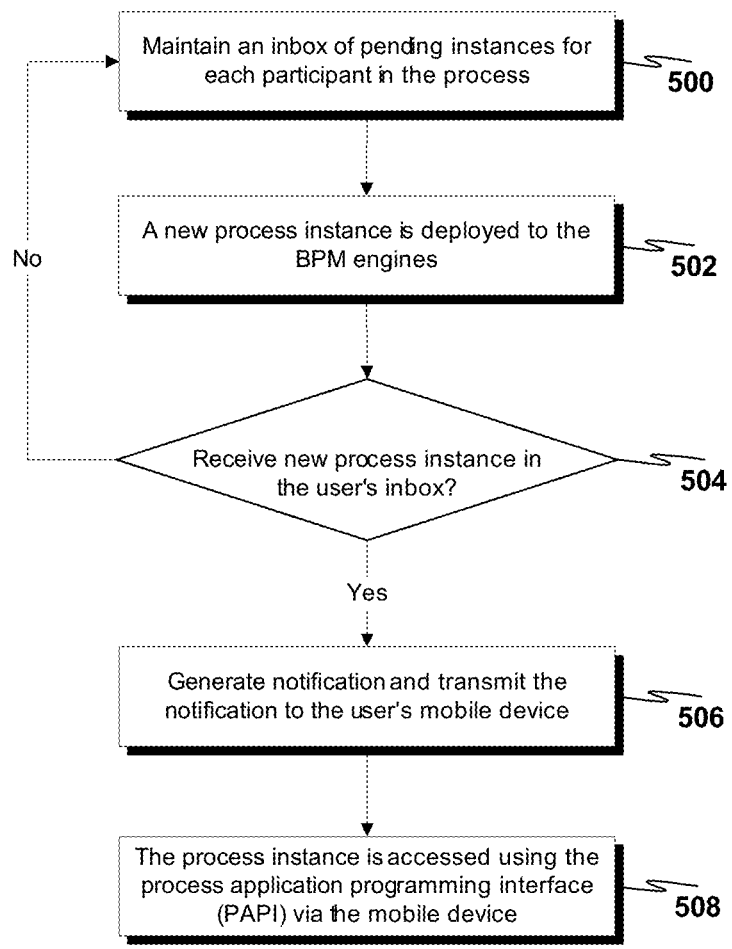
FIG. 5 is an exemplary flow chart diagram of a client mobile device functionality in accordance with various embodiments.

FIG. 5 is an exemplary flow chart diagram of a client mobile device functionality in accordance with various embodiments. Although this figure depicts functional steps in a particular sequence for purposes of illustration, the process is not necessarily limited to this particular order or steps. One skilled in the art will appreciate that the various steps portrayed in this figure can be changed, omitted, rearranged, performed in parallel or adapted in various ways.

As shown in step 500, an inbox can be maintained for each participant in the business process. The inbox can store all pending and/or recently executed process instances that belong to the role which the participant has been assigned to. Accordingly, if the user belongs to a role that is responsible for performing a particular task within the process instance, the process instance can be stored in the inbox assigned to that user.

In step 502, a new process instance is deployed to the process engine. This can happen as a result of some external event or by having been set up by an administrator. The process instance can be delivered to the user's inbox based on whether the user belongs to a particular role. Since the role can be parametric, the delivery to the inbox can also be affected by dynamic variables evaluated at runtime.

In step 504, it can be determined whether the new process instance has been delivered to the inbox. If it has not, the process continues in idle state, maintaining the inbox of pending instances. If the process reaches the inbox, a notification can be generated and transmitted to the user of the mobile device, as shown in step 506. The notification can be a WAP push message or some another technique for informing the user that the state of the inbox has changed.

In step 508, the mobile device can be used to access the process instance. PAPI interface can be used to perform this function. As an example, PAPI interface can be used to initiate a case in the process, query for the state of a given case, execute a particular activity, search for cases in a given step of the process, and perform various other functions. Accordingly, the user is allowed to check for pending instances, process existing instances, execute various global activities and receive notifications about new instances on his wireless device, without having to connect to a personal computer.

Various embodiments previously described include a computer program product which is a storage medium (media) having instructions stored thereon/in and which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, micro drives, magneto-optical disks, holographic storage, ROMs, RAMS, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information.

Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments and containers, virtual machines, as well as user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A computer-implemented system for accessing business process instances from an associated mobile device by an associated participant wherein the associated mobile device is connected via a wireless protocol to the computer-implemented system, the computer-implemented system comprising:

an execution engine configured to instantiate a business process instance from a business process definition wherein the business process definition defines a plurality of tasks; and a mobile work portal configured to allow access to the business process instance from the associated mobile device, wherein the mobile work portal comprises:

a filter that determines, based on task metadata associated with a pending task of the business process instance, whether the pending task is capable of completion using the associated mobile device, wherein the task metadata comprises rendering requirements for displaying the pending task, wherein the filter determines whether the pending task is capable of completion on the associated mobile device based on the rendering requirements and an interface of the associated mobile device, wherein, when the pending task is not capable of completion using the associated mobile device based on the rendering requirements, the filter determines whether an alternative display for the pending task is available having rendering requirements such that the pending task is capable of completion using the associated mobile device, wherein the mobile work portal is configured to render task information that allows completion of the pending task and permits the associated participant using the associated mobile device to interact with the rendered task information and access the execution engine to complete the pending task determined by the filter to be capable of completion using the associated mobile device.

2. The system of claim 1, wherein the mobile work portal is configured to render the task information according to a mobile device client type associated with the associated mobile device.

3. The system of claim 1, wherein:

the mobile work portal further comprises a process application programming interface (PAPI); and the PAPI is configured to permit a client executing on the associated mobile device to invoke the execution engine to complete the pending task.

4. The system of claim 1, wherein the mobile work portal is configured to permit execution of a global activity by the associated participant on the associated mobile device wherein the global activity handles tasks that are not associated with any particular business process instance.

5. The system of claim 4, wherein the mobile work portal is configured to restrict execution of the global activity according to a global activity task type.

6. The system of claim 1, wherein the mobile work portal is configured to authenticate the associated participant using the associated mobile device via a logon page.

7. The system of claim 1, wherein the mobile work portal is configured to render a list of views and receive a selection of at least one view from the list of views, wherein the selected view corresponds to a type of interface on the associated mobile device.

8. The system of claim 1, wherein the mobile work portal is configured to render task information that allows completion of the pending task by navigating a plurality of pending tasks and interacting with a workspace.

9. The system of claim 1, wherein the mobile work portal is configured to synchronize the business process instance to the associated mobile device such that the pending task of the business process instance is executable by the associated participant in a timely fashion.

10. A computer-implemented method for accessing business process instances from an associated mobile device by an associated participant wherein the associated mobile device is connected via a wireless protocol, the computer-implemented method comprising:

instantiating on an execution engine a business process instance from a business process definition by executing a plurality of tasks defined by the business process definition; and providing a mobile work portal configured to allow accessing to the business process instance from the associated mobile device, wherein the mobile work portal comprises a filter determining whether a pending task of the business process instance is capable of completion using the associated mobile device based on task metadata associated with the pending task, wherein the task metadata comprises rendering requirements for displaying the pending task and the filter determines whether the pending task is capable of completion on the associated mobile device based on the rendering requirements and an interface of the associated mobile device, wherein, when the pending task is not capable of completion using the associated mobile device based on the rendering requirements, the filter determines whether an alternative display for the pending task is available having rendering requirements such that the pending task is capable of completion using the associated mobile device, wherein the mobile work portal is configured to render task information that allows completion of the pending task and permits the associated participant using the associated mobile device to interact with the rendered task information and access the execution engine to complete the pending task determined by the filter to be capable of completion using the associated mobile device.

11. The method of claim 10, wherein the rendering comprises rendering the task information according to a mobile device client type associated with the associated mobile device.

12. The method of claim 10, further comprising providing the mobile work portal with a process application programming interface (PAPI), wherein the PAPI is configured to permit a client executing on the associated mobile device to invoke the execution engine to complete the pending task.

13. The method of claim 10, wherein:

the mobile work portal permits execution of a global activity by the associated participant on the associated mobile device; and the global activity handles tasks that are not associated with any particular business process instance.

14. The method of claim 13, wherein the mobile work portal restricts execution of the global activity according to a global activity task type.

15. The method of claim 10, wherein the mobile work portal authenticates the associated participant using the associated mobile device via a logon page.

16. The method of claim 10, wherein the mobile work portal:
  renders a list of views;
  receives a selection of at least one view from the list of views, wherein the selected view corresponds to a type of interface on the associated mobile device.

17. The method of claim 10, wherein the rendering comprises rendering task information that allows completion of the pending task by navigating a plurality of pending tasks and interacting with a workspace.

18. The method of claim 10, wherein the mobile work portal synchronizes the business process instance to the associated mobile device such that the pending task of the business process instance is executable by the associated participant in a timely fashion.

19. A non-transitory computer readable media comprising instructions stored thereon for supporting accessing business process instances from an associated mobile device by an associated participant wherein the associated mobile device is connected via a wireless protocol, which instructions, when executed by an associated computer, cause the associated computer to perform a method comprising:
  instantiating on an execution engine a business process instance from a business process definition by executing a plurality of tasks defined by the business process definition; and
  providing a mobile work portal configured to allow accessing the business process instance from the associated mobile device, wherein the mobile work portal comprises a filter determining whether a pending task of the business process instance is capable of completion using the associated mobile device based on task metadata associated with the pending task,
  wherein the task metadata comprises rendering requirements for displaying the pending task,
  wherein the filter determines whether the pending task is capable of completion on the associated mobile device based on the rendering requirements and an interface of the associated mobile device,
  wherein, when the pending task is not capable of completion using the associated mobile device based on the rendering requirements, the filter determines whether an alternative display for the pending task is available having rendering requirements such that the pending task is capable of completion using the associated mobile device,
  wherein the mobile work portal is configured to render task information that allows completion of the pending task and permits the associated participant using the associated mobile device to interact with the rendered task information and access the execution engine to complete the pending task determined by the filter to be capable of completion using the associated mobile device.

20. The non-transitory computer readable media according to claim 19 comprising further instructions stored thereon, which further instructions, when executed by the associated computer, cause the associated computer to provide the mobile work portal with a process application programming interface (PAPI), wherein the PAPI is configured to permit a client executing on the associated mobile device to invoke the execution engine to complete the pending task.

* * * * *